United States Patent [19]

Hoffman et al.

[11] Patent Number: 5,669,751
[45] Date of Patent: Sep. 23, 1997

[54] TRANSPORT SYSTEM FOR WORKPIECES

[75] Inventors: James R. Hoffman, Cincinnati; Robert F. Massmann, Wilmington, both of Ohio

[73] Assignee: Cincinnati Milacron Inc., Cincinnati, Ohio

[21] Appl. No.: 239,776

[22] Filed: May 9, 1994

[51] Int. Cl.$^6$ ................................................. B65G 35/00
[52] U.S. Cl. ...................... 414/751; 714/684.3; 714/787; 714/786; 198/950; 483/3; 409/134
[58] Field of Search ........................ 414/680, 684.3, 414/749, 786, 751-753, 225, 787; 198/950; 483/3; 82/124; 409/134, 903; 165/11.2

[56] References Cited

U.S. PATENT DOCUMENTS

| | | | |
|---|---|---|---|
| 2,766,561 | 10/1956 | Carlson | 51/114 |
| 3,355,799 | 12/1967 | Daugherty | 29/568 |
| 3,366,012 | 1/1968 | Richter | 90/11 |
| 3,930,302 | 1/1976 | Ochiai et al. | 29/568 |
| 4,576,537 | 3/1986 | Inaba et al. | 414/222 |
| 4,673,076 | 6/1987 | Mattson | 198/346.2 |
| 4,677,718 | 7/1987 | Babel | 29/33 |
| 4,677,733 | 7/1987 | Andersson | 29/563 |
| 4,742,609 | 5/1988 | Neumann | 29/568 |
| 4,768,902 | 9/1988 | Rutschle et al. | 409/134 |
| 4,795,300 | 1/1989 | Tomaselli et al. | 414/217 |
| 4,797,989 | 1/1989 | Cherko | 29/568 |
| 4,809,422 | 3/1989 | Kitamura | 29/568 |
| 4,863,319 | 9/1989 | Winkler et al. | 409/134 |
| 4,863,320 | 9/1989 | Rutschle et al. | 409/134 |
| 4,886,592 | 12/1989 | Anderle et al. | 204/298 |
| 4,966,505 | 10/1990 | Winkler et al. | 409/134 |
| 4,999,895 | 3/1991 | Hirose et al. | 29/33 |
| 5,168,886 | 12/1992 | Thompson et al. | 414/225 X |
| 5,181,898 | 1/1993 | Piotrowski | 483/3 |

OTHER PUBLICATIONS

Avenger CNC Turning Centers brochure, Cincinnati Milacron publication No. L–644, Copr. 1992 Cincinnati Milacron Marketing Company.

Acramatic 850SX Computer Numerical Control brochure, Cincinnati Milacron publication No. CTL–483–1, Copr. 1991, Cincinnati Milacron Marketing Co.

*Primary Examiner*—Donald W. Underwood
*Attorney, Agent, or Firm*—Thomas M. Farrell

[57] ABSTRACT

A machine guard has an opening with a detachable door; i.e., sliding tracks and hinges are not used for door support. When an outside loader arm and its part grippers move to the door, the door is unlatched from the guard and attached to the arm. The arm and grippers then move through the opening, taking the door away from the opening.

2 Claims, 5 Drawing Sheets

5,669,751

1

TRANSPORT SYSTEM FOR WORKPIECES

FIELD OF THE INVENTION

This invention relates to systems for transporting workplaces into and out of an enclosure where workplaces are processed.

BACKGROUND OF THE INVENTION

Many machines, including turning machines and milling machines, have protective enclosures, or guards, surrounding a work processing or machining zone. Such enclosures usually have a manually openable door for periodic operator duties. In a fully automatic machine, a work handling device is often employed to speed production time; i.e., the device supplies a rough workpiece to the machine and removes a finished workpiece, at designated intervals in the cycle. The usual way of covering an access opening for parts entering and leaving the enclosure is to provide a door, which is swingable on hinges or is slidable in a track, where the door is powered by an air cylinder, for example. Once incorporated into a guard design, sliding and swinging doors are not easily relocated on a work enclosure because of the space taken by the support structure, and sliding and swinging doors are not easily retrofitted to existing machine guards in the field, when it is desired to add automation. The supporting hinges and tracks for access doors are subject to wear and potential jamming from chips and dirt, and may present a maintenance problem.

The following invention obviates many of the difficulties inherent in the prior art devices by providing a transport system which utilizes an access door having no pivot joints and no sliding tracks.

SUMMARY OF THE INVENTION

The invention is shown embodied in a transport system for workpieces, comprising:

an enclosure for a machine, which comprises
  a guard for substantially enclosing a workpiece processing zone,
  an opening in the guard for transit of workpieces into and out of the guard,
  a door, sized to close the opening, and
  means for releasably locking the door to the guard; and a workpiece transporter, which comprises
  a base, proximal the machine enclosure,
  a support arm, movably mounted to the base, for movement through the opening,
  means for gripping a workpiece, the gripping means being mounted to the support arm and movable through the opening, and
  means for releasably attaching the door to the support arm, whereby, when the support arm and gripping means are moved to the enclosure, the door is unlocked from the guard and attached to the support arm by the attaching means, and whereby, as the support arm and gripping means are further moved through the opening and into the guard, the door moves with the support arm, away from the opening.

2

Figure 1:
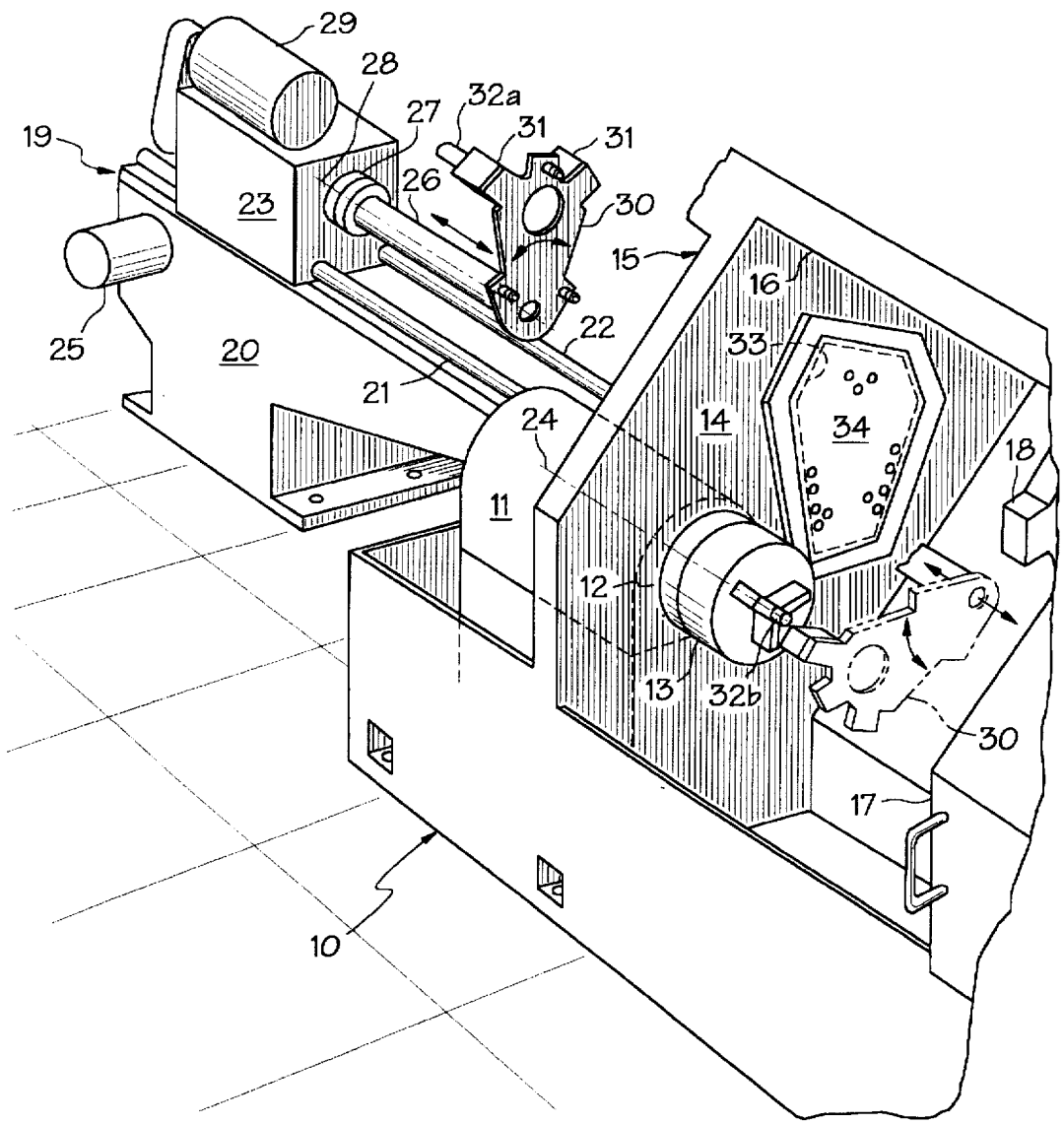
FIG. 1 is a front perspective view, looking at the chuck end of a turning machine headstock.
Figure 3:
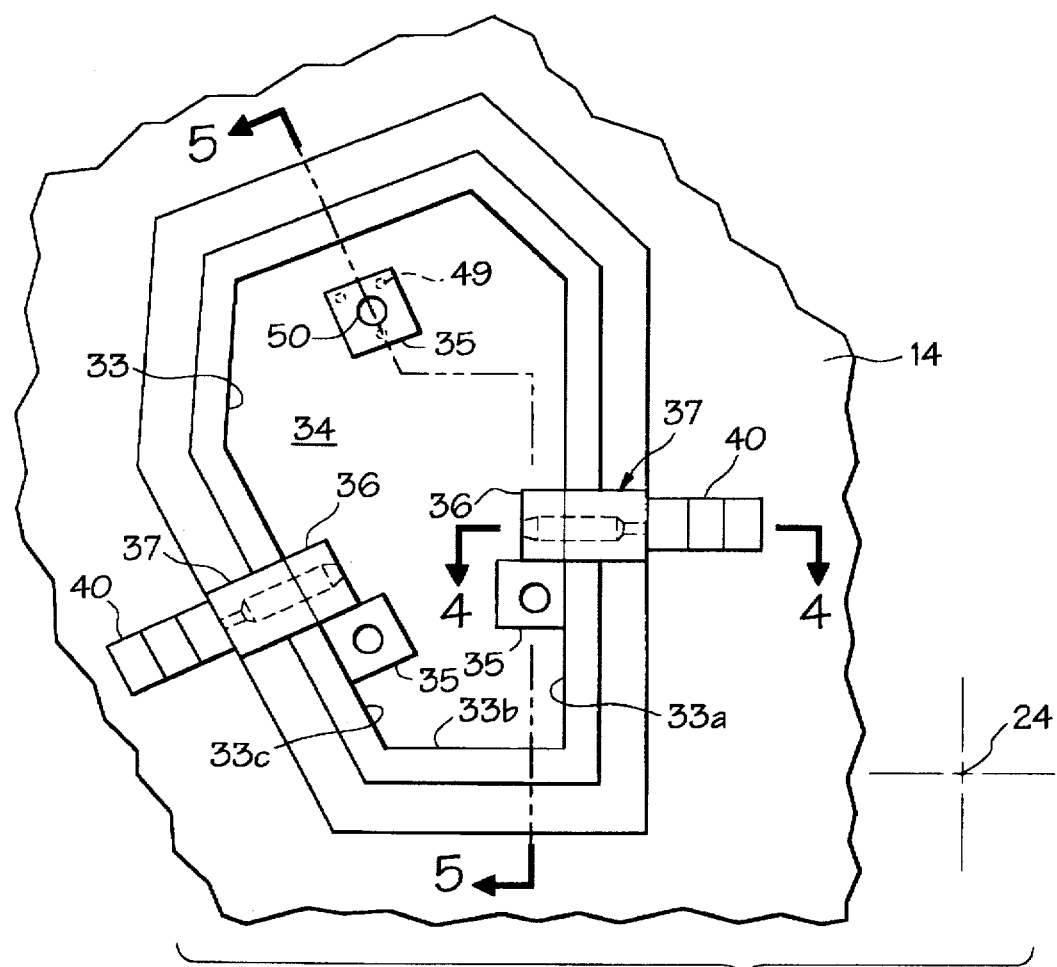

FIG. 3 is a rear elevational view of the door assembly of FIG. 1.

Figure 4:
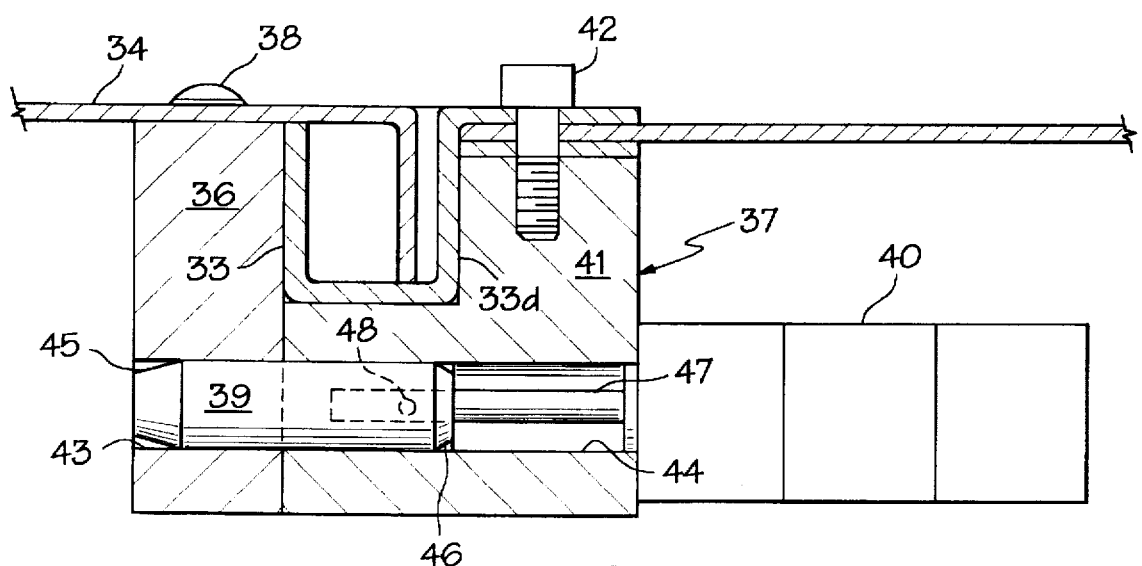

FIG. 4 is a plan section through a door latching mechanism, taken along the line 4—4 of FIG. 3.

Figure 5:
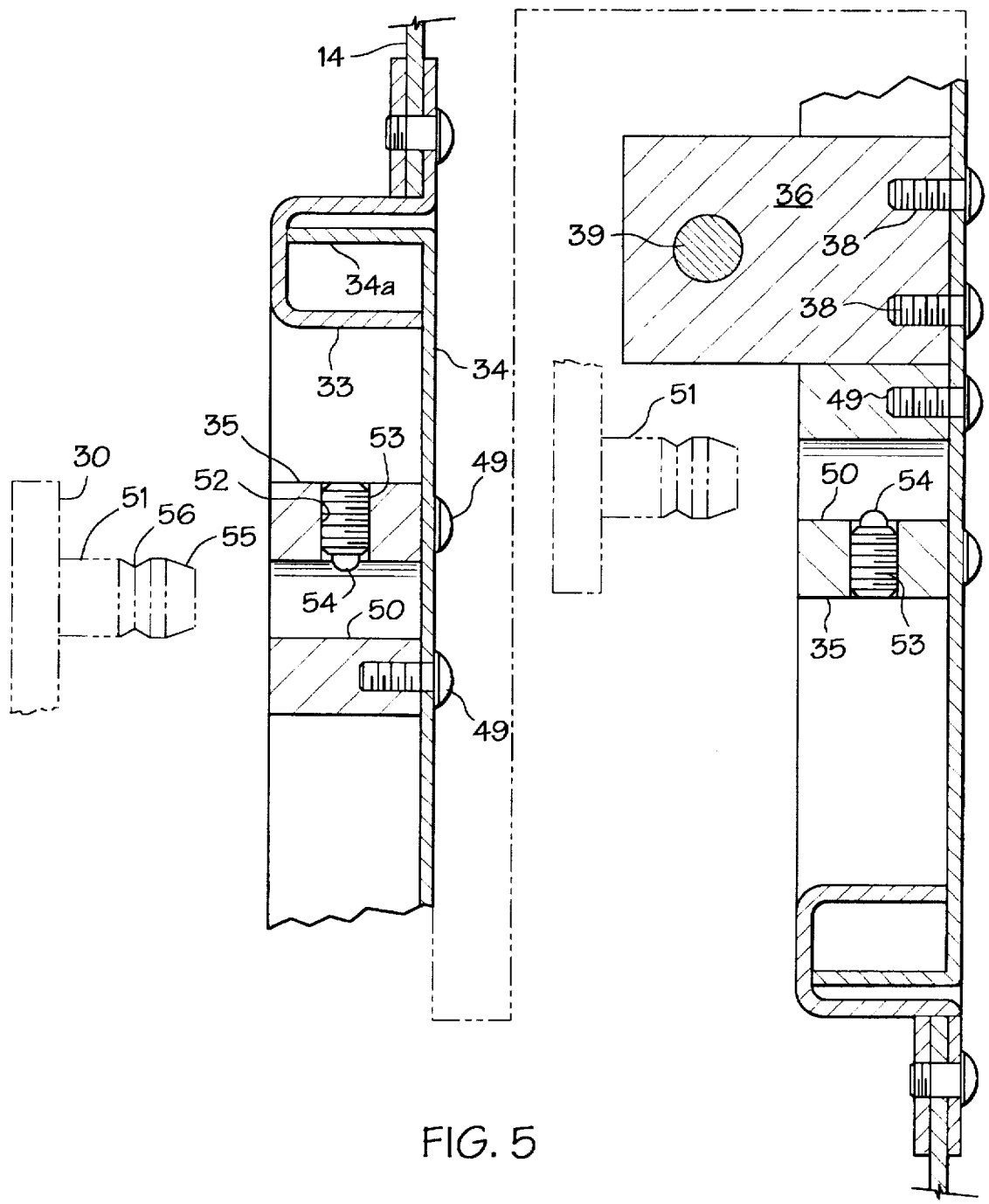

FIG. 5 is an elevational section through the door assembly taken along the line 5—5 of FIG. 3.

Figure 6:
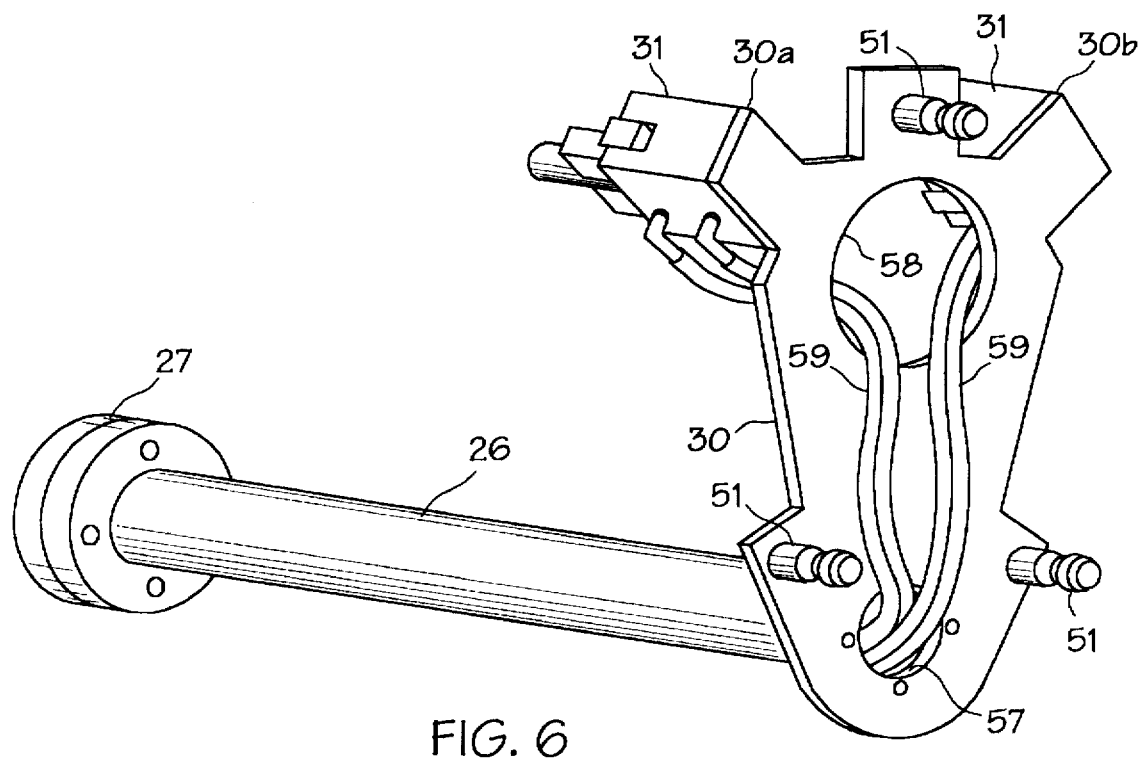

FIG. 6 is a close-up perspective view of the support arm and end plate, illustrating door attaching pins.

Figure 7:
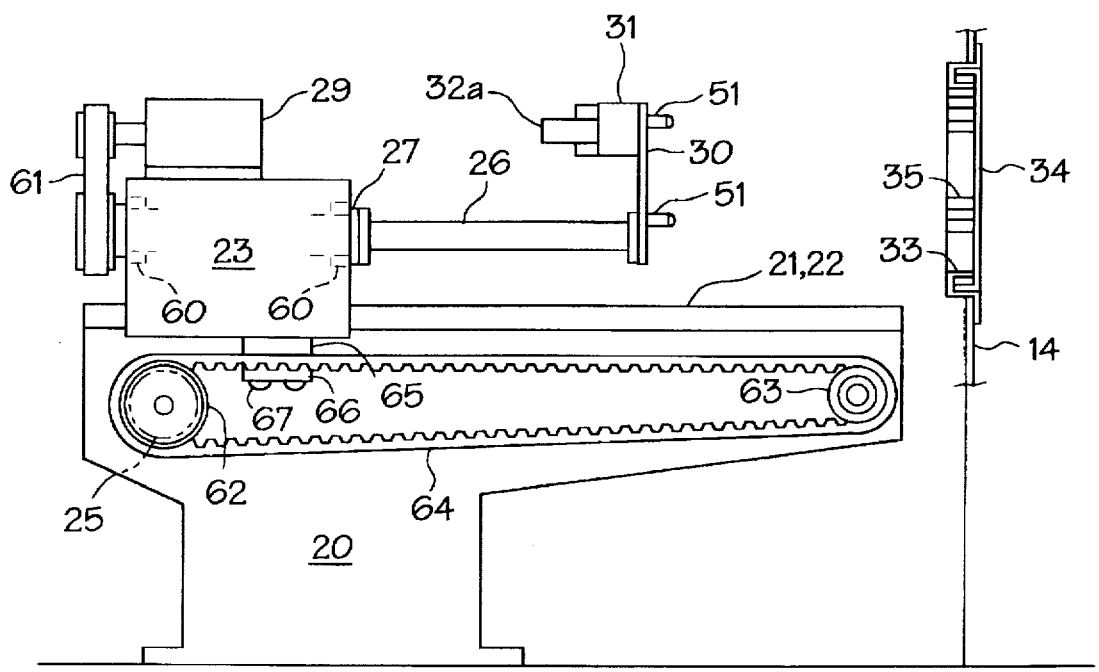

FIG. 7 is a side elevational view, in partial section, of a workpiece transporter.

Figure 8A:
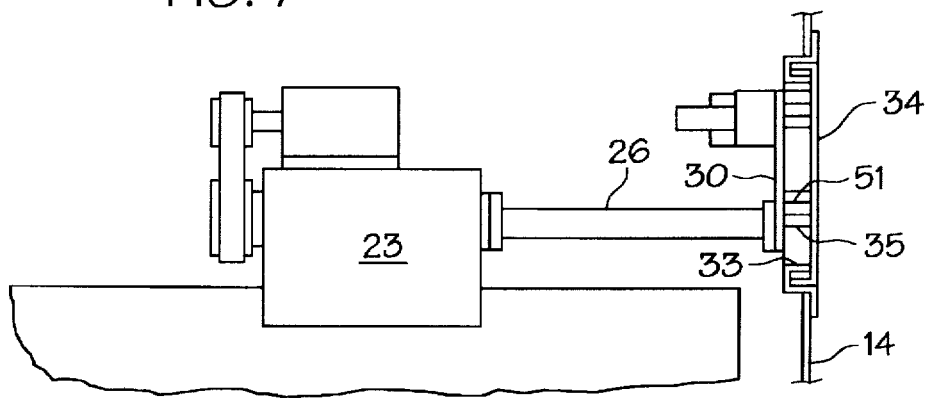
Figure 8B:
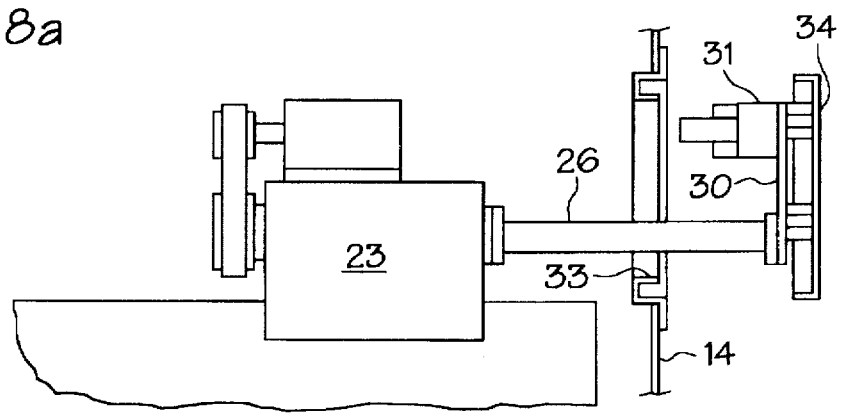

FIGS. 8a–b are sequential drawings of the loading portion of a cycle.

DESCRIPTION OF THE INVENTION

Referring to the drawings, FIG. 1 shows a turning machine 10 having a headstock 11, rotary spindle 12, and workholding chuck 13. An exemplary turning machine 10 is the AVENGER® 200T turning center, with an ACRA-MATIC® 850SX CNC (computer numerical control unit—not shown) for automatically controlling machine cycles; both machine and control are available from Cincinnati Milacron Inc., assignee of the present invention.

The spindle nose and chuck 13 extend through a bulkhead 14, which is a sheet metal wall comprising part of the machine enclosure 15. The enclosure 15 comprises a sheet metal guard 16 surrounding the machining zone; i.e. the interior of the guard constitutes a machining zone, where workpieces are processed. An operator access door 17 is shown retracted to view the interior of the guard 16, where a tool turret 18 is shown in a parked position. A workpiece transporter 19 is stationed on the floor at the rear of the machine headstock 11. The transporter 19 has a hollow fabricated base 20, upon which a pair of linear ways 21,22 support a carriage 23 for linear movement, parallel to the headstock spindle centerline 24. The carriage 23 is driven by a first servomotor 25 mounted to the base 20.

The carriage 23 has a tubular, cantilevered support arm 26 extending from its rotary spindle 27, and the spindle 27 and support arm 26 are rotatably positioned about the carriage spindle centerline 28 by a second servomotor 29 mounted to the carriage 23. An end plate 30 is affixed to the support arm 26, and the end plate 30 has two workpiece grippers 31 which are used to deliver a rough workpiece 32a to the chuck 13 and to remove a finished workpiece 32b from the chuck 13. The support arm 26 and end plate 30 move the grippers 31 into the machining zone through a keystone-shaped, framed opening 33 in the bulkhead 14. Once the support arm 26 is linearly positioned within the machining zone, the arm 26 is linearly shifted (by the first servomotor 25) and rotatably indexed (by the second servomotor 29) to extract a finished workpiece 32b and insert a rough workpiece 32a.

The opening 33 in the bulkhead 14 is covered by an access door 34 which must be opened and closed when changing workpieces 32a,b.

Figure 2:
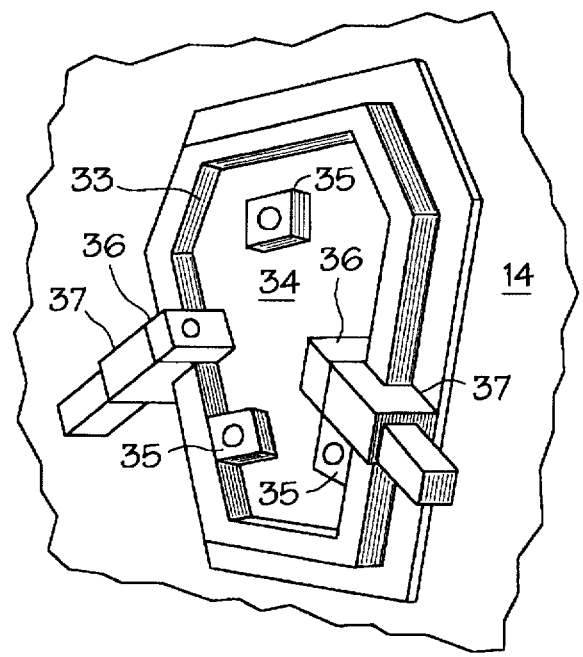
FIG. 2 is a rear perspective view, looking at the rear surface of the bulkhead and door of FIG. 1.

FIG. 2 is a rear perspective view of the bulkhead 14 and access door 34; three attaching blocks 35 and two latching blocks 36 are affixed to the door 34. The latching blocks 36 interact with locking units 37 affixed to the bulkhead 14 and these will be discussed further in connection with FIGS. 3–5.

FIG. 3 is a rear elevational view of the bulkhead 14, depicting the door 34 in relation to the headstock spindle centerline 24. The door 34 has the pair of latching blocks 36, each affixed by a pair of screws 38 (see FIG. 5), the blocks 36 being made of an engineering grade plastic; for example, Delrin. The blocks 36 are situated on the plane of the door 34 at the edge of the framed opening 33, and will extend through the opening 33 when the door 34 is closed. One long edge 33a of the irregularly shaped opening 33 is nearly vertical, while its short adjacent bottom edge 33b is nearly horizontal. The other long side 33c of the opening is angled with respect to the vertical long side 33a. Thus, when the door 34 is closed, the latching blocks 36 tend to wedge into the opening 33 under gravity and prevent the door 34 from shifting downward. Latching takes place by a pair of locking units 37 which are affixed to the bulkhead 14 and frame 33d and the locking units 37 have a slidable locking pin 39 which may be retracted and advanced by an air cylinder 40 affixed to the body 41 of the locking unit 37. With reference to FIG. 4, the latching block 36 is shown affixed to the door 34 and extending outwardly through the opening 33 beyond the frame 33d. The locking unit 37 has an L-shaped body 41 which is affixed to the bulkhead 14 and frame 33d by screws 42, and the body 41 reaches over the frame 33d, adjacent to the latching block 36. In-line bores 43,44 are provided through the latching block 36 and locking unit body 41, and a locking pin 39, having end tapers 45,46, is slidably mounted therein. An air cylinder 40 is mounted to the body 41, and its piston rod 47 extends into the locking pin 39 and is affixed by means of a cross pin 48. In this manner, therefore, the locking pin 39 may be advanced and retracted at predetermined times, simply by energizing a solenoid-operated air valve (not shown) which drives the piston rod 47.

Referring back to FIG. 3, the three square attaching blocks 35 are affixed to the door 34 by a trio of screws 49 in each block 35. The attaching blocks 35 are arranged in a triangular pattern, two immediately below and adjacent the respective latching blocks 36, and the third near the top of the door 34. The attaching blocks 35 are also made from an engineering grade plastic, such as Delrin, and each has a central bore 50 for receiving an attaching pin 51 (see FIG. 5). With reference to FIG. 5, the attaching block 35 has a cross-drilled and tapped hole 52 extending to the bore 50, and a ball-nosed spring plunger 53 is threadably received therein so that the nose 54 of the spring plunger 53 extends into the bore 50. When it is desirable to remove the door 34, the nose 54 captivates itself with an attaching pin 51 which is pushed into the bore 50.

The attaching pin 51, shown in phantom in FIG. 5, is generally cylindrical, having a taper 55 at its leading end, and a V-shaped groove 56 around its periphery. As the pin 51 is inserted into the bore 50, the ball nose 54 of the spring plunger will detent itself into the V-groove 56 to prevent the door 34 from being separated from the pin 51 until such time as the door 34 is again closed. The generally-planar door 34 has a stiffening edge 34a which nests within the C-shaped cross-section of the sheet metal frame 33d. Three attaching pins 51 are affixed to the end plate 30 of the transport arm 26 (see FIG. 6). Thus, as the plate 30 and attaching pins 51 are moved rightward in FIG. 5 before the locking pins 39 are withdrawn, the spring plungers 53 will detent themselves with the attaching pins 51. Once the locking pins 39 have been retracted, further movement of the end plate 30 and attaching pins 51 in a rightward direction will remove the door 34 from the bulkhead 14. Thereafter, the transporter end plate 30 will move entirely through the opening 33 to gain access to the work chuck 13. After an exchange of workpieces 32a,b between the chuck 13 and grippers 31, the support arm 26 and its end plate 30 are moved in a leftward direction, exiting the opening 33, and the door 34 is returned to its home, or closed position with the bulkhead 14. Once the door 34 is in home position, the locking pins 39 are advanced to the secure the door 34; now, further movement of the end plate 30 and attaching pins 51 to the left will overcome the detenting force of the spring plungers 53 and allow the attaching pins 51 to be stripped free of the door 34.

The closeup perspective view of FIG. 6 shows the cantilevered support arm 26 attached to the transporter carriage spindle 27, and the end plate 30 attached to the support arm 26. The end plate 30 carries the three attaching pins 51 in the same triangular arrangement as the attaching blocks 35 on the door 34, as shown in FIG. 3. The pair of upper ears 30a,b on the end plate 30 each carry a commercial air-powered gripper 31, such as that manufactured by the PHD Company. Please note that, while a pair of squared grippers 31d are shown, many types of commercial chucks may be substituted therefor at the discretion of the designer. A pair of large holes 57,58 through the end plate 30 facilitate routing of air hoses 59, etc., which are brought through the center of the support arm 26 to the grippers 31.

FIG. 7 shows the transporter base 20 and its ways 21,22 extending close to the bulkhead 14 and opening 33. The carriage spindle 27 is rotatably supported in bearings 60 located within opposite ends of the carriage 23, and the second servomotor 29 is connected through a belt drive 61 to the carriage spindle 27. The first servomotor 25 is has a timing pulley 62 which is connected to an idler pulley 63, rotatably mounted near the bulkhead end of the base 20, by means of a long timing belt 64. The timing belt 64 is attached to the bottom of the carriage 23 by a pair of blocks 65, 66 and screws 67 so that rotary motion of the second servomotor 29 is converted into linear motion of the carriage 23 and support arm 26. The cantilevered support arm 26 supports the end plate 30, which, in turn, carries the workpiece grippers 31 and workpieces 32a,b, as well as the attaching pins 51.

FIGS. 7 and 8a–b illustrate a loading portion of the transport cycle. In FIG. 7, the door 34 is shown closed with the bulkhead 14, and the transport support arm 26 and end plate 30 are shown retracted, to an extreme leftward position. In FIG. 8a, the transporter carriage 23 has moved rightward until the attaching pins 51 engage the attaching blocks 35 of the door 34; then, the locking pins 39 are retracted. In FIG. 8b, the transport support arm 26, end plate 30, and door 34 are moved to the further rightward position, so that the grippers 31d may cooperate with the machine chuck to extract a finished workpiece 32b and insert a rough workpiece 32a (see FIG. 1).

In the unloading portion of the transport cycle, the movements are reversed. The transporter carriage 23, support arm 26, end plate 30 and door 34 are moved leftward until the door 34 covers the opening 33, and the locking pins 39 are then advanced to secure the door 34. Next, the support arm 26 and end plate 30 continue movement to the further leftward position of FIG. 7, stripping the attaching pins 51 from the door 34.

While the preferred embodiment utilizes a detent mechanism as the means for releasably attaching the door 34 to the support arm 26 (i.e., attaching block 35, attaching pin 51, spring plunger 53), a powered means for releasably attaching the door could be readily substituted for the detent mechanism. For example, an air-operated or solenoid-operated catch could be employed to couple the door 34 to the arm 26.

Those skilled in the art will appreciate that the described system offers versatility in design since the door 34 and framed opening 33 may be oriented in many attitudes, and the support arm 26 and end plate 30 may be attached to a variety of transport mechanisms.

The relatively simple construction of the framed opening and door combination makes it ideal for upgrading existing machines, when it is desired to automate hand-loaded machinery. Further, the simplified door and opening structure provides great flexibility to designers of new machines, who may be confronted with the problem of where to locate an opening in a new machine enclosure and how to cover that opening.

While the invention has been shown in connection with a preferred embodiment, it is not intended that the invention be so limited; rather, the invention extends to all such designs and modifications as come within the scope of the appended claims.

What is claimed is:

1. A transport system for workpieces, comprising:

an enclosure for a machine, comprising
- a guard for substantially enclosing a workpiece processing zone,
- an opening in said guard for transit of workpieces into and out of said guard,
- a door, sized to close said opening, and
- means for releasably locking said door to said guard; and a workpiece transporter, comprising
- a base, proximal said machine enclosure,
- a support arm, movably mounted to said base, for movement through said opening,
- means for gripping a workpiece, said gripping means being mounted to said support arm and movable through said opening, and
- means for unlocking and releasably attaching said door to said support arm, said attaching means being mounted, in part, to said support arm, whereby, when the support arm and gripping means are moved to the enclosure, the door is unlocked from the guard and attached to the support arm by the attaching means, and whereby, as the support arm and gripping means are further moved through the opening and into the guard, the door moves with the support arm, away from the opening.

2. A method for transporting workpieces, comprising the following steps:

providing an enclosure for a machine, wherein the enclosure includes
- a guard for substantially enclosing a workpiece processing zone,
- an opening in said guard for transit of workpieces into and out of said guard,
- a door, sized to close said opening, and
- means for releasably locking said door to said guard;

providing a workpiece transporter, wherein the transporter includes
- a base, proximal said machine enclosure,
- a support arm, movably mounted to said base, for movement through said opening,
- means for gripping a workpiece, said gripping means being mounted to said support arm and movable through said opening, and
- means for releasably attaching said door to said support arm, said attaching means being mounted, in part, to said support arm;

moving said support arm and gripping means to said enclosure;

attaching said door to said support arm;

unlocking said door from said guard;

moving said support arm and gripping means through said opening; and moving said door away from said opening while moving said support arm and gripping means.

* * * * *